United States Patent [19]

Kim

[11] Patent Number: 5,213,595
[45] Date of Patent: May 25, 1993

[54] COMBINED INDOOR FOUNTAIN-AIR CLEANER

[76] Inventor: Nam-Sub Kim, 449-864, Sunghwan-ri, Sunghwan-eub, Chunan-gun, Chungcheongnam-do, Rep. of Korea

[21] Appl. No.: 916,421

[22] Filed: Jul. 21, 1992

[30] Foreign Application Priority Data

Jul. 27, 1991 [KR] Rep. of Korea ............... 1991-11907

[51] Int. Cl.$^5$ .................... B03C 3/16; B01D 47/06
[52] U.S. Cl. .................................. 55/122; 55/223; 55/228; 55/385.2; 55/472
[58] Field of Search ............... 55/122, 124, 126, 228, 55/385.1, 385.2, 472, 473, 223

[56] References Cited

U.S. PATENT DOCUMENTS

| | | | |
|---|---|---|---|
| 3,800,505 | 4/1974 | Tayves | 55/122 X |
| 4,385,911 | 5/1983 | Popeil et al. | 55/472 X |
| 4,473,382 | 9/1984 | Cheslock | 55/126 |
| 5,141,539 | 8/1992 | Hiouani | 55/385.1 |

*Primary Examiner*—Charles Hart
*Attorney, Agent, or Firm*—Lowe, Price, LeBlanc & Becker

[57] ABSTRACT

A combined indoor fountain-air cleaner. The fountain-air cleaner comprises a lower base part including a base and a water reservoir, which is equipped with a water circulation pump and a nozzle head, a middle part for providing an inner space wherein the fountain is playing and the air is allowed to be circulated so as to cause the impurities floating in the air to be moisturized, an upper cap part covering the middle part and provided with a plurality of air inlet holes, a suction fan assembly for causing the indoor air to be sucked into and to be circulated in the fountain-air cleaner, a baffle board for causing the sucked air to be freely dispersed and to be guided to the inner space of the middle part, a plurality of impurity absorption plates which are adapted for absorbing the impurities in the air and are radially mounted on a lower inner surface of the middle part, and an insert assembly for filtering off the impurities and permitting the water to be silently recovered by the reservoir. This fountain-air cleaner efficiently filters off the impurities in the air and permits the closed inner space thereof, wherein the fountain is playing, to be viewed with admiration from the outside and, in this respect, decorates the interior of a room.

4 Claims, 3 Drawing Sheets

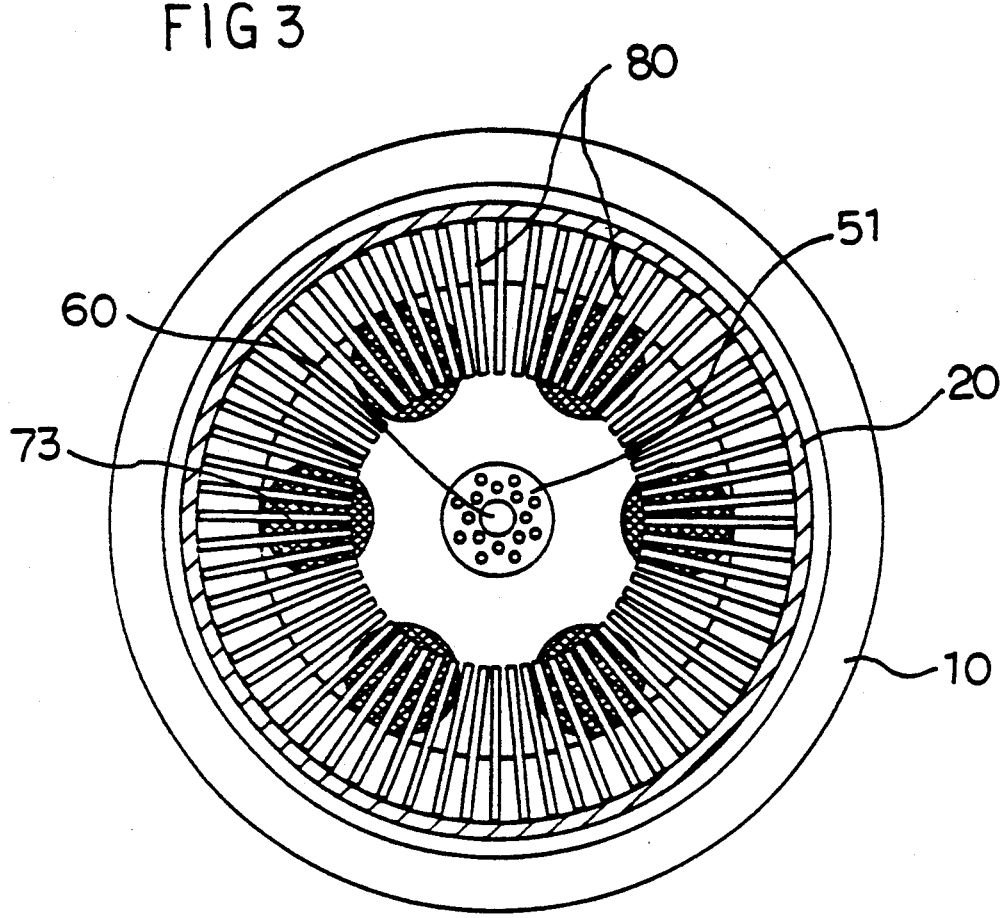
FIG 3
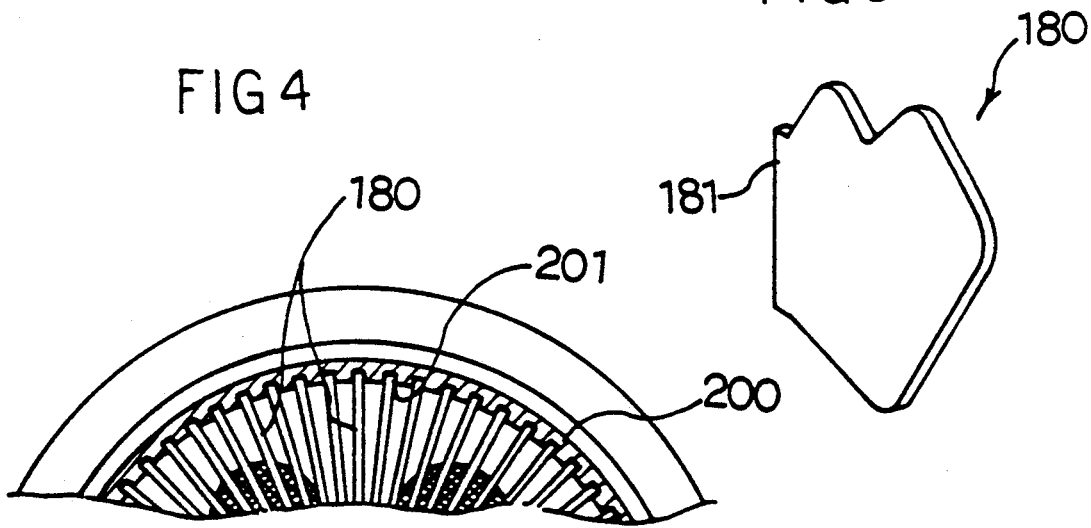
FIG 4
FIG 5

COMBINED INDOOR FOUNTAIN-AIR CLEANER

BACKGROUND OF THE INVENTION

1. Field of the Invention

The present invention relates in general to a combined indoor fountain-air cleaner, and more particularly to a combined indoor fountain-air cleaner which permits the indoor air to be sucked therein so as to pass through its closed inner space, wherein the fountain is playing and a filtering member is equipped, and to be then exhausted to the outside, thereby filtering off the impurities such as dusts floating in the air, in addition, permits the closed inner space, wherein the fountain is playing, to be viewed with admiration from the outside and, in this respect, decorates the interior of a room.

2. Description of the Prior Art

Known air cleaners are generally classified into several types such as a mechanical type, a chemical type and an electrostatic type. In the first type of cleaner, the air is sucked in a casing of the cleaner so as to pass through a fabric filter disposed in the casing and to be exhausted to the outside, thereby mechanically filtering off the impurities in the air. In the second type of cleaner, the sucked air passes through an activated charcoal filter so as to cause the impurities in the air to be absorbed by the high absorbent activated charcoal filter. On the other hand, in the third type of cleaner, the impurities in the sucked air is filtered off by being collected by electrostatic filter plates.

However, the known mechanical and chemical types of air cleaners have a disadvantage in that they are generally equipped with a filter having a coarse structure, respectively, such that they can not filter off minute impurities and, moreover, in the case of contamination of the filter due to repeated use, the filtering effect of the filter is inevitably reduced so that it is required to often change the contaminated filter for a new one and this causes maintenance thereof to be burdensome and the maintenance cost to be increased.

On the other hand, in the case of the known electrostatic type of air cleaner, it is known that this type of cleaner provides an advantage in that it can efficiently filter off the minute impurities in the air. However, it is also known that this type of cleaner has a disadvantage in that it entails high manufacturing cost due to the electrostatic mechanism and requires to be periodically cleaned so as to remove the impurities collected on the electrostatic filter plates, thereby causing the maintenance thereof to be burdensome.

In addition, the aforementioned known air cleaners generally have a hexahedral casing, respectively, of which the external appearance is scarcely considered in view of beauty, so that they impair the interior design for decorating the interior of a room and, in this respect, they have an additional disadvantage in that they cause a problem in taking up a space for installation thereof.

SUMMARY OF THE INVENTION

It is, therefore, an object of the present invention to provide a combined indoor fountain-air cleaner in which the above-mentioned disadvantages can be overcome and which efficiently filters off impurities, such as dusts and the other substances which are bad for the health, floating in the indoor air.

It is another object of the present invention to provide a combined indoor fountain-air cleaner which has a good appearance such that it is used as an interior decoration.

It is further object of the present invention to provide a combined indoor fountain-air cleaner which is easily installed and moved to another place as required.

In an aspect, the present invention provides a combined indoor fountain-air cleaner which permits the indoor air to be sucked therein so as to pass through its closed inner space, wherein the fountain is playing and a filtering member is equipped, and to be then exhausted to the outside, thereby efficiently filtering off the impurities, such as dusts and solid substances which are bad for the health, floating in the air as well as deodorizing the air.

In another aspect, the present invention provides a combined indoor fountain-air cleaner, which permits its closed inner space wherein the fountain is playing to be viewed with admiration from the outside, is equipped with an illumination lamp of a desired color, which lights up the inner space of the fountain-air cleaner so as to improve the decorating effect, and is easily changed in its installation place, thereby being efficiently used as a decoration for dressing up the interior of a room.

In further aspect, the present invention provides a combined indoor fountain-air cleaner which permits its inner space, in which the equipments and water are enclosed, to be observed from the outside and, in this respect, allows maintenance thereof, such as cleaning of the equipments and changing of the water, to be easily carried out.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a sectioned view taken along the section line A—A of FIG. 2;

FIG. 4 is a partial view corresponding to FIG. 3, but showing another embodiment of a combined indoor fountain-air cleaner in accordance with the present invention; and FIG. 5 is a perspective view showing an impurity absorption plate equipped in the combined indoor fountain-air cleaner of FIG. 4.

DETAILED DESCRIPTION OF THE PREFERRED EMBODIMENTS

Figure 1:
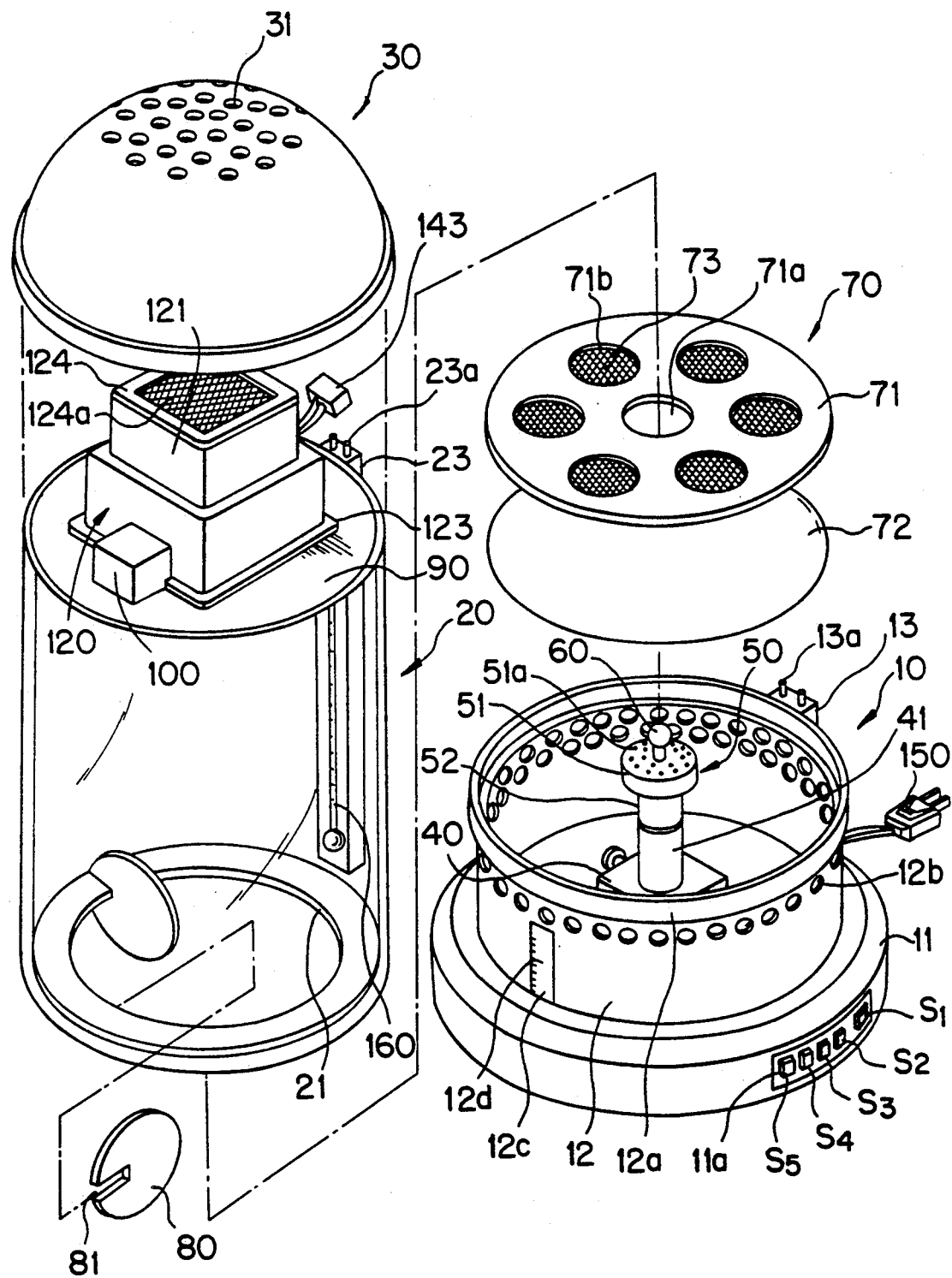
FIG. 1 is an exploded view showing an embodiment of a combined indoor fountain-air cleaner in accordance with the present invention.
Figure 2:
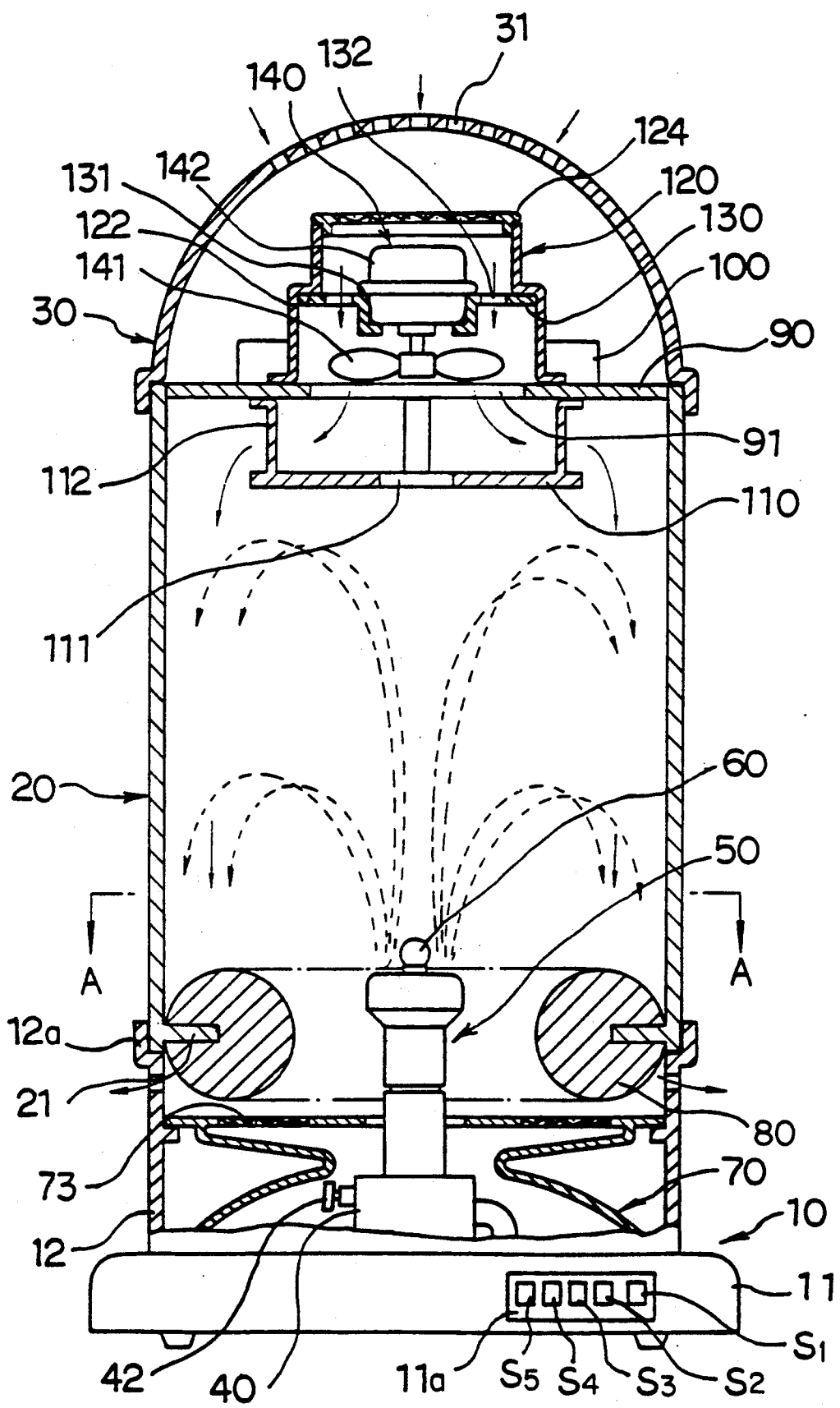
FIG. 2 is an elevational sectioned view of the combined indoor fountain-air cleaner of FIG. 1.

With reference to FIGS. 1 to 3 showing an embodiment of a combined indoor fountain-air cleaner according to the present invention, the combined indoor fountain-air cleaner 1 (hereinafter, referred to simply as "the fountain-air cleaner") comprises three parts, that is, a lower base part 10, a cylindrical middle part 20 and an upper cap part 30.

As shown in FIG. 1, the lower base part 10 comprises a circular-sectioned base 11, in which electric equipments are enclosed, and a cylindrical water reservoir 12 disposed on the base 11.

The base 11 is provided at an outer side surface thereof with a switch panel 11a including a power on-off switch $S_1$, a circulation pump drive switch $S_2$, an illumination lamp on-off switch S₃, a suction fan drive switch S₄, an anion supply switch S₅ and etc..

On the other hand, the reservoir 12 has a larger diameter part 12a, which integrally upwardly extends from the upper end of the reservoir 12 so as to engage with a lower end of the middle part 20. This reservoir 12 is provided with a plurality of exhaust holes 12b formed by perforating the upper circumferential side wall thereof.

An electric connector 13 is provided at an outer side surface of the reservoir 12. This connector 13 encloses electric wires and is equipped with a pair of terminals 13a which vertically upwardly extend from its upper end.

This reservoir 12 is constructed to be opaque, but is provided at a side surface thereof with a transparent window 12c for permitting the inside of the reservoir 12 to be observed from the outside so that the amount of water in the reservoir 12 is easily checked as required. The window 12c has a scale mark 12d for indicating the water level inside the reservoir 12.

A water circulation pump 40, preferably a centrifugal pump, for causing the water in the reservoir 12 to be drawn up and upwardly spouted from a nozzle is provided in the bottom center of the reservoir 12. To the upper end of the pump 40, a vertical connection pipe 41 is connected so as to permit the pump 40 to communicate with a nozzle assembly 50 which is in turn mounted on an upper end of the connection pipe 41.

The nozzle assembly 50 comprises a circular nozzle head 51, which has a plurality of spout holes 51a formed at upper surface thereof, and a connection pipe 52 through which the assembly 50 is connected to the connection pipe 41 of the pump 40.

An illumination lamp 60 is mounted on the top center of the nozzle head 51 so as to light up the inside of the fountain-air cleaner.

Additionally, the reservoir 12 allows a circular insert assembly 70 to be laterally received therein. The insert assembly 70 comprises a circular filtering plate 71 and a water guide pipe 72 which integrally downwardly extends from the under surface of the filtering plate 71 and is constructed to be gradually reduced in its diameter until its middle part but to be gradually increased in its diameter until its lower end, as depicted in FIG. 2.

Turning again to FIG. 1, the filtering plate 71 is provided with a center through hole 71a having a predetermined diameter which allows the nozzle head 51 to be inserted without trouble. Around the through hole 71a, the plate 71 has a plurality of circular openings 71b which have a filter 73, respectively, and are circumferentially formed so as to be spaced apart from each other by a predetermined distance.

The cylindrical middle part 20 is made of a transparent material such as a transparent synthetic resin or a glass so as to permit the inner space thereof to be viewed from the outside.

This middle part 20 is provided with an annular fitting flange 21 which inwardly radially extends from the circumferential lower end of the part 20 and to which a plurality of circular impurity absorption plates 80 are fitted so as to be radially disposed as shown in FIG. 3. Each circular absorption plate 80 has a fitting slit 81 which is radially formed therein and through which the plate 80 is tightly fitted to the fitting flange 21.

In addition, an electric connector 23 corresponding to the connector 13 of the reservoir 12 is vertically mounted on an outer surface of the middle part 20. This connector 23 encloses electric wires and is provided at a lower end thereof with a pair of female terminals (not shown) for engaging with the terminals 13a of the connector 13 and at an upper end thereof with a pair of terminals 23a for engaging with female terminals of a connector 143 of a fan motor 142 which will be described in detail below.

On the other hand, a circular plate 90, which is provided with a circular center opening 91, is disposed to cover the upper end of the middle part 20. The circular plate 90 is also provided with a baffle board 110 which is connected to the under surface of the plate 90 and has a center opening 111. This baffle board 110 is disposed to be downwardly spaced apart from the plate 90 by a predetermined distance. To achieve such an arrangement, a plurality of supports 112 are provided between the circular plate 90 and the baffle board 110.

On the circular plate 90, a rectangular-sectioned fan casing 120, which defines an upper small chamber 121 by forming a step 122 at a middle portion thereof, is mounted. This fan casing 120 is also provided with a peripheral flange 123 which laterally outwardly extends from the lower end of the casing 120 so as to provide a contact surface for reinforcing the connection between the casing 120 and the circular plate 90.

A lateral support 130 is mounted on the under surface of the lateral step 122 of the casing 120 so as to support a suction fan assembly 140 as shown in FIG. 2. This support 130 is constructed to have a rectangular-shaped plate which is provided with a center cylindrical depression 131 for receiving a fan motor 142. At the plane part of the support 130 around the center depression 131, a plurality of air circulation holes 132 are formed.

The suction fan assembly 140, comprising a suction fan 142 and the fan motor 142, is supported at a given position inside the fan casing 120 as the fan motor 142 is fitted in the cylindrical depression 131 of the support 130.

The fan motor 142 includes an electric cord which has a connector 143 at the free end thereof so as to be electrically connected to the terminals 23a of the connector 23 provided in the middle part 20.

In addition, the fan casing 120 enclosing the fan motor 142 is covered with a filtering lid 124 provided with a filter plate 124a.

On the other hand, a pair of anion generators 100 are disposed at both sides of the fan casing 120.

The middle part 20 is covered with the hemispherical cap part 30 which is constructed to be opaque such that it prevents the fan casing 120, which is disposed as upwardly protruding from the upper end of the middle part 20 as described above, from being viewed from the outside. In this respect, the cap part 30 improves the external appearance of the fountain-air cleaner of this invention.

This cap part 30 is formed with a plurality of air inlet holes 31 through which the indoor air, which is to be purified, is sucked into the fountain-air cleaner.

Turning to FIG. 4 and 5 showing another embodiment of the fountain-air cleaner of this invention, this alternate embodiment has the general shape remaining the same as in the primary embodiment, but is altered in the shape of each absorption plate 180 and in the engagement of the plate 180 with respect to a middle part 200.

That is, the impurity absorption plate 180 has a noncircular shape which is resulted from forming a fitting end 181 at a side thereof, a wave part at the upper end thereof and sharp-pointed corners at both ends of the fitting end 181 as depicted in FIG. 5.

In addition, the middle part 200 of this alternate embodiment is provided, at an inner surface thereof corresponding to the annular fixing flange 21 of the primary embodiment, with a plurality of vertical fitting slits 201 each of which is radially formed and in each of which the fitting end 181 of the corresponding absorption plate 180 is fitted so as to achieve the fitting engagement of the plate 180 with respect to the middle part 200.

In the above description of the embodiments, the impurity absorption plate 80 or 180 is constructed to have the circular shape having the fitting slit 81 or to have the non-circular shape having the fitting end 181 and is mounted on the inner surface of the middle part 20 or 200 by fitting the fitting slit 81 or the fitting end 181 onto the annular fitting flange 21 or into the vertical fitting slit 201 of the middle part 20 or 200. However, besides aforementioned shapes, the impurity absorption plate may be constructed to have another shape within the scope of the invention. Also, in the case of modification of the absorption plate, the engagement style of the absorption plate with respect to the middle part will be modified following suit.

The operational effect of the present fountain-air cleaner having the aforementioned structure will be described as follows.

In operation of the fountain-air cleaner, the suction fan assembly 140, the illumination lamp 60 and the water circulation pump 40 are independently operated from each other by controlling each corresponding switch in the switch panel 11a.

To purify the indoor air, the fountain-air cleaner is allowed to be supplied with electric power by electrically connecting a plug 150 thereof to an outside power supply after confirming whether the water is contained in the reservoir 12 to a predetermined level. Thereafter, the power on-off switch $S_1$, the pump drive switch $S_2$ and the suction fan drive switch $S_4$ of the switch panel 11a are operated so as to operate the circulation pump 40 and the suction fan assembly 140.

Upon starting the operation of the circulation pump 40, the water in the reservoir 12 is pumped up by the pump power so as to be upwardly spouted from the spout holes 51a of the nozzle head 51 to a predetermined height in the inner space of the middle part 20 and in turn naturally drops so as to be recovered by the reservoir 12 with drawing a gentle curve.

At this time, the dropping water passes by the impurity absorption plates 80 which are radially disposed in the middle part 20 and in turn passes through the filtering plate 71 of the circular insert assembly 70 wherein the water drops as passing through the center through hole 71a and the circular openings 71b having filters 73, thereafter, the water is recovered by the reservoir 12. Here, the guide pipe 72 allows the water having passed through the center through hole 71a and the circular openings 71b to flow down the inner surface thereof so that it permits the water to be silently recovered by the reservoir 12.

On the other hand, the air is sucked into the fountain-air cleaner through the air inlet holes 31 of the cap part 30 by the sucking power generated by the suction fan assembly 140. The sucked air in turn passes through the filter plate 124a of the filtering lid 124 so as to be received in the fan casing 120 wherein the air in turn passes through the circular center opening 91 of the circular plate 90 in order to be struck against the upper surface of the baffle board 110.

As the air is struck against the upper surface of the baffle board 110, the air is reduced in its current speed and radiates its current direction simultaneously with flowing down as passing through the center opening 111 of the baffle board 110. The air from the baffle board 110 then passes through the inner space, wherein the fountain is playing, of the middle part 20 and in turn passes by the absorption plates 80 prior to being struck against the filtering plate 71 of the circular insert assembly 70 wherein the water drops as passing through the center through hole 71a and the circular openings 71b having filters 73 so as to be recovered by the reservoir 12 as described above.

The air circulating in the space between the absorption plates 80 and the filtering plate 71 is then exhausted to the outside through the exhaust holes 12b formed at the upper circumferential side wall of the reservoir 12.

During the air circulation in this fountain-air cleaner, the indoor air is purified at the time when it passes through the inner space of the middle part 20, wherein the fountain is playing, and passes by the absorption plates 80.

When the air including impurities, such as dusts and another particle substances, passes through the inner space of the middle part 20 wherein the fountain is playing, each impurity is moisturized so that it is increased in its weight and viscosity. Thus, when the air including the impurities passes by the absorption plates 80, much more impurities are absorbed by the absorption plates 80 due to the increased weight and viscosity thereof.

Here, the impurities absorbed by and adhered to the absorption plates 80 are then washed by the water which downwardly passes by the absorption plates 80, thus being removed from the absorption plates 80 and dropping together with the water onto the filtering plate 71 of the circular insert assembly 70. At the filtering plate 71, a large part of the impurities is filtered off by the filter 73 of the circular openings 71b of the plate 71 so as to be remained thereon and the other part of the impurities simply passes through the filter 73 together with the water in order to be recovered by the reservoir 12.

In the fountain-air cleaner of this invention, the impurities are remained on the filter 73 and float in the water contained in the reservoir 12 as described above and, in this respect, it is required to periodically wash the filter 73 of the filtering plate 71 and to often change the contaminated water including the impurities for new water.

To wash the filter 72 of the filtering plate 71, the middle part 20 is held up so as to be separated from the lower base part 10 and to allow the circular insert assembly 70 to be separated from the reservoir 12. On the other hand, the contaminated water is easily changed for the new water after separating the middle part 20 from the lower base part 10 in the same manner as described above.

On the other hand, this fountain-air cleaner is equipped with the illumination lamp 60 at the top of the nozzle head 51 so that the inner space of the middle part 20, wherein the fountain is playing, is lighted up as required. Thus, the inner space of the middle part 20 made of a transparent material is allowed to be viewed with admiration from the outside. In result, this lamp 60 improves the decorating effect of the fountain-air cleaner of this invention.

The anion generators 100, which are disposed at both sides of the fan casing 140, generate anions which is known as being good for the health. These anion generators 100 are controlled in its operation by the anion supply switch S5 provided at the switch panel 11a of the base 11. The anions generated by the generators 100 are mixed with the air circulating in the fountain-air cleaner and in turn exhausted to the outside through the exhaust holes 12b of the reservoir 12.

In addition, this fountain-air cleaner deodorizes the sucked air and makes the air be humidified, thereby additionally functioning as a deodorizer and a humidifier.

As described above, the present invention provides a combined indoor fountain-air cleaner in which the indoor air sucked in is circulated in the inner space of the cylindrical middle part, wherein the fountain is playing, so as to cause the impurities floating therein to be moisturized and, in this respect, causes much more impurities to be absorbed by the impurity absorption plates disposed in the middle part. This fountain-air cleaner also deodorizes the indoor air as well as humidifying the air so that it additionally functions as a deodorizer and a humidifier.

The cylindrical middle part of this fountain-air cleaner is made of a transparent material such as glass so as to permit the inner space thereof, wherein the fountain is playing, to be viewed with admiration from the outside, thereby providing an advantage in that it decorates the interior of the room. Furthermore, this fountain-air cleaner is equipped with an illumination lamp of a desired color which lights up the inner space of the middle part, wherein the fountain is playing, thereby improving the decorating effect of the fountain-air cleaner, especially in the case of use at night.

This fountain-air cleaner is constructed to be easily moved so that it provides another advantage in that it is easily set up on any place having a flat surface and easily moved to another place as required.

In addition, the inner space of the cylindrical middle part is allowed to be observed from the outside because the middle part is made of a transparent material such that it is easily confirmed whether the enclosures, such as the absorption plates, the filtering plate and the water, are to be washed or changed. The fountain-air cleaner is also constructed such that the cylindrical middle part thereof is also easily separated from the lower base part. In result, the aforementioned enclosures are allowed to easily washed or changed as requested. Furthermore, to use this fountain-air cleaner, there scarcely needs maintenance cost except for electric charges for operating the drive parts such as a circulation pump and a fan motor.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A combined indoor fountain-air cleaner comprising:
   a lower base part including a base and a water reservoir disposed on said base, said base being provided with a switch panel for controlling the operation of said fountain-air cleaner and said water reservoir being equipped therein with a water circulation pump and a nozzle head through which the water pumped up by said water circulation pump is upwardly spouted;
   a middle part for providing an inner space wherein the fountain is playing and the air is allowed to be circulated so as to cause the impurities floating in the air to be moisturized, said middle part being disposed between the lower base part and an upper cap part;
   said upper cap part for covering said middle part, the upper cap part being provided with a plurality of air inlet holes for permitting the indoor air to be sucked into the fountain-air cleaner therethrough;
   a suction fan assembly for causing the indoor air to be sucked into and to be circulated in the fountain-air cleaner, said suction fan assembly being mounted on an upper end of the middle part;
   a baffle board for causing the sucked air to be freely dispersed and to be guided to the inner space of the middle part, said baffle board being mounted on an under surface of said suction fan assembly so as to be spaced apart therefrom by a predetermined distance;
   a plurality of impurity absorption plates for absorbing the impurities in the air, each said impurity absorption plate being radially mounted on a lower inner surface of the middle part; and
   an insert assembly for filtering off the impurities and permitting the water to be silently recovered by said reservoir, said insert assembly being received in the reservoir and comprising a filtering plate, which is provided with a plurality of filters, and a guide pipe which is disposed under said filtering plate and adapted to guide the water so as to be silently recovered by the reservoir.

2. A combined indoor fountain-air cleaner according to claim 1, wherein said middle part is made of a transparent material so as to permit the inner space thereof, wherein the fountain is playing, to be viewed with admiration from the outside.

3. A combined indoor fountain-air cleaner according to claim 1, wherein said fountain-air cleaner further comprises an illumination lamp for lighting up said inner space of the middle part, said illumination lamp being mounted on a top end of said nozzle head inside the lower base part.

4. A combined indoor fountain-air cleaner according to claim 1, wherein said fountain-air cleaner further comprises anion generating means for generating anions which are to be exhausted to the outside of said fountain-air cleaner together with the purified air.

* * * * *